Patented Aug. 30, 1949

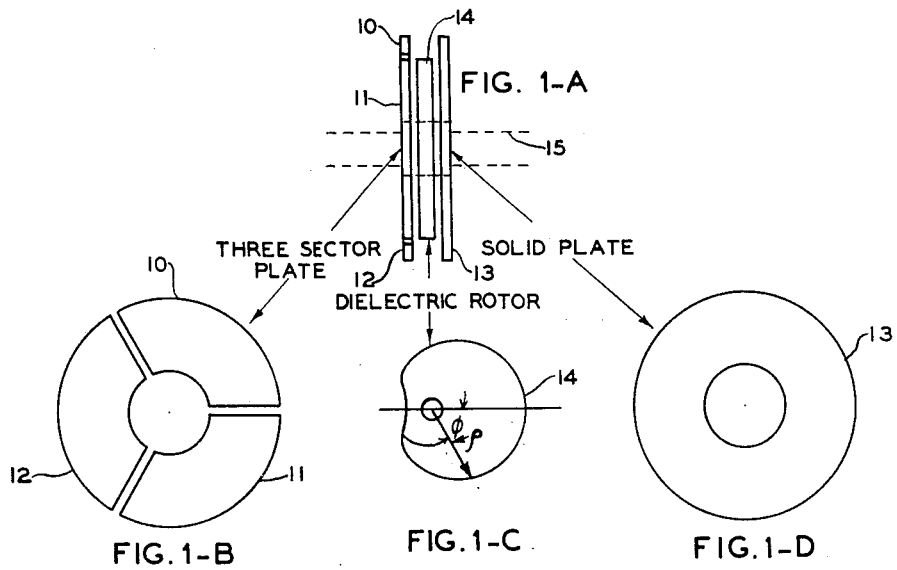
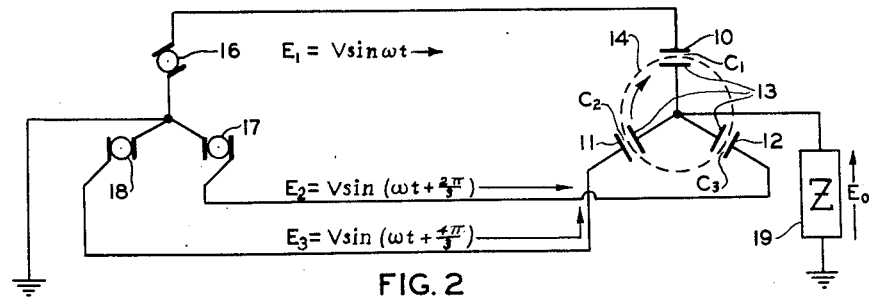
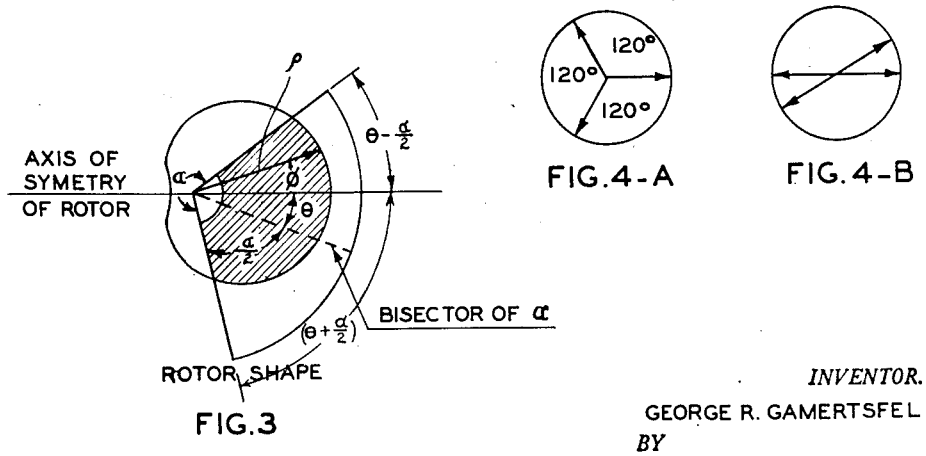

2,480,187

UNITED STATES PATENT OFFICE 2,480,187

ELECTRICAL APPARATUS

George R. Gamertsfelder, Watertown, Mass., assignor, by mesne assignments, to the United States of America as represented by the Secretary of War Application July 9, 1945, Serial No. 604,052

1 Claim. (Cl. 321—51)

The present invention relates to electrical phase shifting apparatus and is more particularly directed to a continuously variable phase shifter of the electrostatic type.

Numerous applications exist both in measurement and transmission circuits for a phase shifting device affording a source of alternating potential which is of constant amplitude but whose phase angle may be continuously varied in a linear manner through an unlimited angular range.

Heretofore phase shifters of this characteristic have required a number of variable inductors or resistors which must be operated in unison. Inductors for this purpose are expensive to construct while variable resistors are unsatisfactory in operation because of the difficulty encountered in making positive electrical contact with them.

A more recent form of phase shifter which overcomes the drawbacks in those of the variable inductor or resistor type is the electrostatic phase shifter wherein the adjustable elements are variable capacitors. One known electrostatic phase shifter comprises two double stator condensers with specially shaped rotors mounted on a common shaft. By impressing sinusoidal voltages that are in phase quadrature to the two pairs of stators, the voltage between the rotor system and ground can be varied through 360° in phase by rotating the shaft. A well known modification of this arrangement involves a single, eccentrically mounted rotor in cooperation with a stator plate divided into four symmetrically arranged sectors.

In order for these known electrostatic phase shifters to function properly it is essential that the impressed voltages be adjusted to exact phase quadrature. This factor introduces a disadvantage by reason of the difficulty experienced in making such an adjustment. Accordingly, it is an object of this invention to improve phase shifters of the electrostatic type by providing a simpler capacitor construction operating in combination with a source of three phase sinusoidal voltages in contrast to the four phase devices of the prior art.

The advantage of a three-phase electrostatic phase-shifting device resides in the ease and rapidity with which it is possible to determine whether the applied voltages have the desired phase relationship. In accordance with the present invention there is provided a phase shifting capacitor comprising two spaced stator plates, one of said plates being formed of three equal and symmetrically arranged sectors, the other of said plates being of solid construction. A rotor is interposed between said stator plates consisting of a dielectric material which varies the capacitance of the plates. By impressing three phase sinusoidal voltages on the three sectors the voltage between the solid stator and ground can be varied through 360° in phase by a full revolution of the rotor. A feature of the invention is the design of the dielectric rotor which is such as to give a linear relationship between its angle of rotation and the phase of the resultant output voltage.

For a better understanding of this invention as well as other objects and further features thereof, reference is had to the following detailed description to be read in connection with the accompanying drawing wherein like components are designated by like numerals.

In the drawing:

Figure 1—A is a side view of a preferred embodiment of a variable capacitor structure in accordance with the invention, while Figures 1—B, 1—C, and 1—D show separately the three main components of said capacitor, Figure 2 is a schematic diagram of an electrostatic phase shifter incorporating the capacitor shown in Figure 1, Figure 3 is illustrative of the design considerations in the rotor shape of said capacitor, and Figure 4—A shows in vector diagram a voltage relationship in a three-phase system, while Figure 4—B shows a voltage relationship in a four-phase system.

Referring now to the drawing and more particularly to Figures 1—A, 1—B, 1—C, and 1—D, the capacitor is seen to comprise a disc shaped, annular stator plate divided into three, equal sectors 10, 11, and 12, a similarly shaped, solid stator plate 13, and a rotor plate 14, composed of dielectric material. mounted between said stator plates on a shaft 15.

The capacitor is represented schematically in Figure 2 by capacitances $C_1$, $C_2$, and $C_3$, which in combination with three alternators 16, 17 and 18, generating balanced three phase sinusoidal voltages $E_1$, $E_2$, and $E_3$, form a phase shifting device developing a voltage $E_0$ across an impedance Z represented by load 19. Alternators 16, 17, and 18 have a common neutral terminal connected to ground, the other terminals being connected to stator sectors 10, 11, and 12, respectively. Solid stator plate 13 is connected to one side of load 19 the other side being grounded. The design of dielectric rotor 14 is such that when rotated the values of capacitances $C_1$, $C_2$, and $C_3$ are simultaneously varied causing voltage $E_0$ to shift in phase through 360° while remaining of constant amplitude.

It has been found that the design of the shape of rotor 14 to give a linear relationship between its angle of rotation and the phase of the resultant output voltage is determined by the equation:

$$\rho^2 = A + B \cos \phi$$

where:

$\rho$ = distance from the origin to any point on the perimeter of the rotor.

$\phi$ = angle of rotation of radius vector drawn to this point.

A and B are constants.

The theory justifying this design equation may be understood by a consideration of the following:

*Determination of relationship between capacitances and angle of rotation*

Since the phase shift should be linear with $\theta$, the angle of rotation of the dielectric rotor 14, we must find a relationship between the capacitance and $\theta$ which produces a result of the form:

$$E_0 = K \sin(\omega t - \theta) \qquad (A)$$

where K is a constant

For convenience, a relationship between capacitances $C_1$, $C_2$, and $C_3$, and $\theta$ is assumed, and it will be proved that Equation A results from this assumption. The assumed relationships are as follows:

$$C_1 = D + G \cos \theta \qquad (1)$$

$$C_2 = D + G \cos \left(\theta + \frac{2\pi}{3}\right) \qquad (2)$$

$$C_3 = D + G \cos \left(\theta + \frac{4\pi}{3}\right) \qquad (3)$$

where D and G are constants

To prove the identity, the Kirchhoff law current equation may be written:

Current entering common terminal = current leaving $$(E_1 - E_0)j\omega C_1 + (E_2 - E_0)j\omega C_2 + (E_3 - E_0)j\omega C_3 = \frac{E_0}{Z} \qquad (4)$$

But since we have balanced three-phase applied voltages, $$E_1 = V \sin \omega t \qquad (5)$$

$$E_2 = V \sin \left(\omega t + \frac{2\pi}{3}\right) \qquad (6)$$

$$E_3 = V \sin \left(\omega t + \frac{4\pi}{3}\right) \qquad (7)$$

Thus we have seven equations in eight unknowns (three capacitances, four voltages, and $\theta$) and can find $E_0$ in terms of $\theta$ and the constants.

Solving Equations 1 to 7:

$$E_0 = \frac{3}{2} \frac{VG}{3D + \frac{1}{j\omega Z}} [\sin(\omega t - \theta)]$$

which is of the desired form: $E_0 = K \sin(\omega t - \theta)$

*Determination of equation describing rotor shape:*

Let:

$\alpha$ = central angle of one section of the three-sector stator $\theta$ = angle of rotation of rotor, shown in Figure 3, as angle between axis of symmetry of rotor and bisector of $\alpha$ $\phi$ = angle of rotation of radius vector whose tip follows perimeter of rotor $\rho$ = length of this radius vector The shaded area in Figure 3 represents the area of overlap, and since capacitance is, from physical considerations, linearly related to this area, we can write for one sector, using Equation 1, and recalling that D and G can be any constants, provided D is greater than G $$\text{Area} = D + G \cos \theta$$

But from calculus, Area =

$$\int_{\theta - \frac{\alpha}{2}}^{\theta + \frac{\alpha}{2}} \frac{\rho \cdot \rho d\phi}{2} - \text{constant}$$

or $$\int_{\theta - \frac{\alpha}{2}}^{\theta + \frac{\alpha}{2}} \frac{\rho^2 d\phi}{2} = D + G \cos \theta \qquad (8)$$

Again we solve by assuming the relationship between $\rho$ and $\phi$, and proving the identity.

$$\qquad (9)$$

Let $\rho^2 = A + B \cos \phi$ where A and B are constants

Then substituting in (8)

$$\int_{\theta - \frac{\alpha}{2}}^{\theta + \frac{\alpha}{2}} \left(\frac{A + B \cos \phi}{2}\right) d\phi = D + G \cos \theta$$

which when simplified is $$\frac{A}{2}\alpha + \left(B \sin \frac{\alpha}{2}\right) \cos \theta = D + G \cos \theta \qquad (10)$$

Constants D and G then are $$\frac{A}{2}\alpha \text{ and } \left(B \sin \frac{\alpha}{2}\right)$$

respectively.

It is then seen that the identity is proved and therefore the relationship assumed in (9) is a correct one.

In both the three phase electrostatic phase shifter and in the four phase device it is required that the input sinusoidal voltages be balanced in order to be certain that a phase shifter is operating properly. It is first necessary to determine that the impressed voltages have the correct phase relationship. In the three phase case there is available a convenient method of making this determination which procedure runs as follows: If the three inputs are of equal amplitudes and variable phase it is necessary only to remove the rotor 14 from the capacitor and adjust the phase of the input voltages generated by alternators 16, 17, and 18 until the output voltage measured across load 19 is at zero level. Under this condition the three input voltages must necessarily be 120° displaced in phase from each other. This is true because if the Kirchhoff law current equations are written, it develops that the applied voltages must add to zero. In the three phase case this means that when the amplitudes are equal, as is assumed, they must be 120° apart, as shown in the vector diagram of Figure 4—A.

In the four phase case no such simple determination is possible. For example, if voltages unbalanced as to phase, as demonstrated by the vector diagram in Figure 4—B, were applied to a four phase capacitor, with the rotor removed there would result zero output voltage in spite of the incorrect phase relationship. Consequently, in the four phase device a complicated and time consuming method of adjustment is necessary, whereas the simple method available in the three phase device herein disclosed is of considerable advantage espcially in field maintenance.

The rotor heretofore used for the four phase capacitor was shaped in the form of an eccentric circle. The design of rotor 14 in the present invention is theoretically correct for capacitors with any number of sectors as may be seen from Equation 10, since the angle appears merely as a constant.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

What is claimed is:

In combination with sources of three phase balanced voltages having a common neutral terminal, a variable capacitor including a pair of metallic stators in spaced parallel relation, one of said stators being solid, the other of said stators being divided into three equal sectors, each sector being connected to a respective one of said sources, and a rotor of dielectric material interposed between said stators, the shape of said rotor being determined by the equation:

$$\rho = \sqrt{A + B \cos \phi}$$

where:

$\rho$ = distance from the origin to any point on the perimeter of the rotor.
$\phi$ = angle of rotation of radius vector drawn to this point.
A and B are constants.

so that when said rotor is given a full revolution the capacitances between each of said sectors and said solid stator are simultaneously varied in a manner whereby the voltage between said solid stator and said neutral terminal is of constant amplitude but varies linearly through 360° in phase.

GEORGE R. GAMERTSFELDER.

REFERENCES CITED

The following references are of record in the file of this patent:

UNITED STATES PATENTS

| Number | Name | Date |
|---|---|---|
| 1,589,008 | Kirby | June 15, 1926 |
| 2,147,728 | Wintringham | Feb. 21, 1939 |
| 2,244,023 | Sauer | June 3, 1941 |
| 2,413,391 | Usselman | Dec. 31, 1946 |
| 2,461,832 | Meacham | Feb. 15, 1949 |

OTHER REFERENCES

"Notes on the laws of variable air condensers," by W. H. F. Griffiths in Experimental Wireless and The Wireless Engineer, Jan. 1926, pages 3 to 14.